United States Patent
Reichardt et al.

[11] Patent Number: 5,269,707
[45] Date of Patent: Dec. 14, 1993

[54] CONTACTING APPARATUS FOR A SI-MODULE

[75] Inventors: Manfred Reichardt, Weinsberg; Bernd Schuder, Schwaigern, both of Fed. Rep. of Germany

[73] Assignee: Amphenol-Tuchel Electronics GmbH, Fed. Rep. of Germany

[21] Appl. No.: 645,713

[22] Filed: Jan. 25, 1991

[30] Foreign Application Priority Data

Jan. 30, 1990 [DE] Fed. Rep. of Germany ....... 4002680

[51] Int. Cl.[5] .................................. H01R 23/70
[52] U.S. Cl. ............................ 439/630; 439/60
[58] Field of Search .................. 439/629–637, 439/59, 60, 62, 65, 326–328, 259, 260, 330, 331,

[56] References Cited

U.S. PATENT DOCUMENTS

| | | | |
|---|---|---|---|
| 4,857,001 | 8/1989 | Nakano et al. | 439/330 |
| 5,000,694 | 3/1991 | Komatsu | 439/331 |
| 5,013,255 | 5/1991 | Juret et al. | 439/260 |
| 5,053,199 | 10/1991 | Keiser et al. | 439/260 |

OTHER PUBLICATIONS

"Die Chipkarte am Schlusselbund", appearing in *Design & Elektronik*, Jan. 23, 1990, p. 12.

*Primary Examiner*—David L. Pirlot
*Attorney, Agent, or Firm*—Bacon & Thomas

[57] ABSTRACT

The present invention relates to a contacting apparatus for a SI module. The SI module is provided with contact areas adapted to be contacted by contact elements supported by said contacting apparatus. So as to achieve a contacting apparatus having small outer dimensions, the contact elements of the contact apparatus for the two rows of contact areas are arranged in an intermeshing manner.

8 Claims, 3 Drawing Sheets

CONTACTING APPARATUS FOR A SI-MODULE

TECHNICAL FIELD

This invention relates generally to a contacting apparatus, and more specifically to a contacting apparatus having contact elements (reading contacts) for contacting (and reading) a SI-module.

BACKGROUND ART

A SI- or subscriber identity module, abbreviated as SIM, is an electronic component (typically in the form of a card) comprising for instance an integrated circuit which contains information relating to the identity of, e.g. a subscriber in a telephone system. The subscriber identity module comprises contact areas (short: card contacts) which form a contact pattern, which typically corresponds to the contact pattern of an IC (integrated circuit)-card (chip card) in accordance with the ISO standard 7816. However, the outer dimensions of the SIM card are substantially smaller than the outer dimensions of a chip card, i.e. 25 mm × 50 mm for the SIM and 85,5 mm × 54 mm of the chip card.

It is an object of the present invention to provide a contacting apparatus for a SIM (the term SIM will be used interchangeably with the term SIM-card), such that the outer dimensions of said contacting apparatus are only insignificantly larger than the dimensions of the SIM itself. Preferably, the thickness of the contacting apparatus should preferably be smaller than 3 millimeters.

It is another object of the present invention to provide a contacting apparatus for a SIM such that the contacting forces which are provided by the contact elements of the contacting apparatus are the same or larger than the contacting forces provided by the contact elements of a contacting apparatus for the larger chip cards.

In accordance with a further object of the present invention a switch is provided in the contacting apparatus which closes or opens as soon as the contact elements (the so-called reading contacts) of the contacting apparatus touch upon said contact areas of the SIM located in its reading position in the contacting apparatus.

In accordance with a still further object of the present invention the contacting operation between the contact elements of the contacting apparatus and the contacts of the SIM should be made for certain applications without relative movement between the contacting apparatus (reader) and the SIM card.

A contacting apparatus for customary chip cards is known, but either its length or its height goes beyond the desired dimensions. This is due to the fact that without a limitation of the outer dimensions the same contact forces between 0.2 and 0.4N (Newton) are required. Due to the limitations of contacting forces and spring movement or spring path (comprising the tolerances of the thickness of the card and the preciseness of manufacture) spring elements for the contacting apparatus result which will, if arranged in the traditional way, cause that the above mentioned desired dimensions are exceeded.

The present invention provides for a contacting apparatus obviating the above mentioned disadvantages. The contacting apparatus of the invention is particularly useful for contacting a SIM card, but can be used with a chip card, resulting in very short chip card contacting apparatus.

In accordance with one aspect of the invention the contacting apparatus comprises contact elements which are arranged such that the contact pitch (contact spacing) is cut in half and the length of the contacting apparatus is reduced by the distance of the rows of the contacts of the SIM.

Preferably the contact springs of the contact apparatus for one row of SIM contacts are located between the contact springs for the other row of SIM contacts. Preferably, a cover of the contacting apparatus can be designed to act as a SIM holder, i.e. as a means to hold the SIM in its so-called reading position in the contacting apparatus.

A field of application for the SIM-contacting apparatus of the invention is for so-called mobile telephones. In this example the contacting apparatus is installed into said mobile telephone. As soon as a user has inserted a SIM card into said contacting apparatus and into the reading position, information regarding the subscriber can be read out of said SI module by means connected to said contact elements.

In accordance with another aspect of the invention a chip key as shown in the journal "Design und Elektronik" of Jan. 23, 1990 published in Germany is improved. Said known chip key may contain a SIM which will be contacted when the key is used in a respective contacting apparatus. In this known arrangement the card forming or supporting the SIM is subject to dirt so that high contacting forces are required. Such high contacting forces are not suitable for high contacting cycles. By using the contact elements of the invention, said disadvantage can be overcome. Preferably, the connections or termination ends of said contact elements are designed as second contact locations. In this form the contact element can be inserted into a key connector of the type C701 of Amphenol-Tuchel Electronics GmbH, Heilbronn, Germany. Thus the following advantages are achieved:

The card is covered and thus protected; the contact location which is independent of the card contact is designed for continuous use.

BRIEF DESCRIPTION OF THE DRAWINGS

For a better understanding of the present invention, reference may be made to the accompanying drawings, in which.

Figure 1:
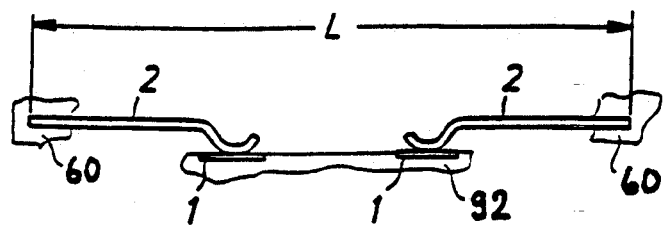
FIG. 1 shows schematically two prior art contact elements of a contacting apparatus, to be used with a customary chip card.
Figure 4:
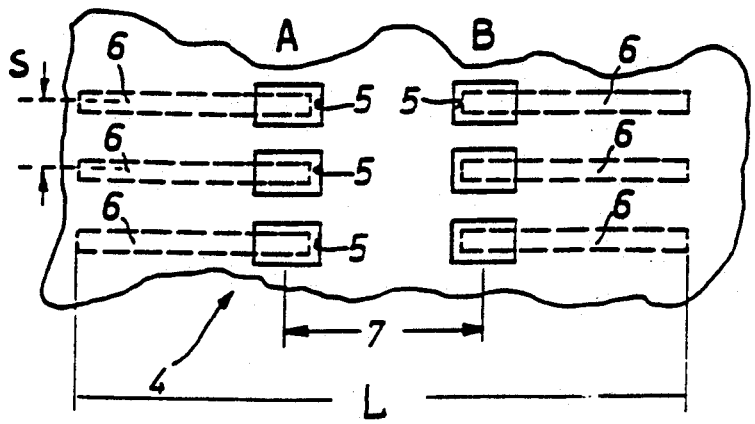
FIG. 4 shows schematically the arrangement of the contact elements as shown in FIG. 1 for a contacting apparatus for a SI module.

Referring first to FIGS. 1 to 4 SIM card contacts or, generally speaking, card contacts 1 are shown as being formed in a SIM card 92, said card contacts 1 are being contacted by contact elements 2 mounted in a contacting apparatus 60 shown schematically in FIGS. 1 and 4. The contact arrangement of FIG. 1 shows that an admissible length L for the contacting apparatus 60 is exceeded.

Figure 2:
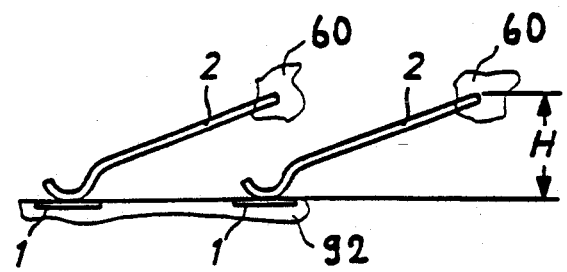
FIG. 2 is a different arrangement of prior art contact elements of a contacting apparatus for a customary chip card.
Figure 3:
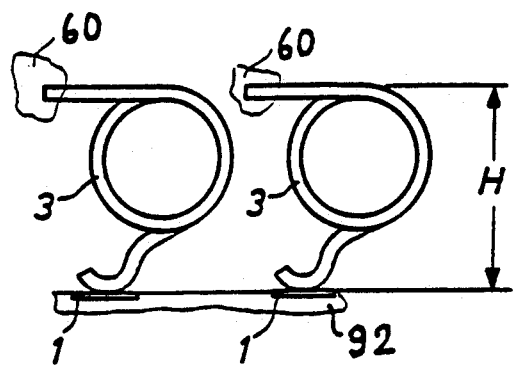
FIG. 3 is an additional schematic arrangement of prior art contact elements of a contacting apparatus for a chip card.

FIG. 2 discloses a similar arrangement as shown in FIG. 1. In this case the admissible height H of the contacting apparatus is exceeded. The same is true for the arrangement of contact elements 3 shown in FIG. 3.

FIG. 4 is a bottom plan view of FIG. 1 of a chip card or SIM receiving chamber 4 of a prior SIM contacting apparatus 60. In said chamber 4 cutouts 5 are shown. In the regions of said cutouts end the contact elements 6 of the contacting apparatus so as to provide a contacting engagement with the SIM contacts 1 of a SIM card (not shown in FIG. 4) inserted into said chamber 4. Said SIM contacts 1 are typically provided in two rows A, B on a card 92 forming said SIM. In FIG. 4 the horizontal distance or spacing of the two rows A, B of (not shown) SIM contacts 1 is referred to by reference numeral 7. The pitch or vertical spacing of the contact elements 6 is referred to by reference signa "S".

Figure 5:
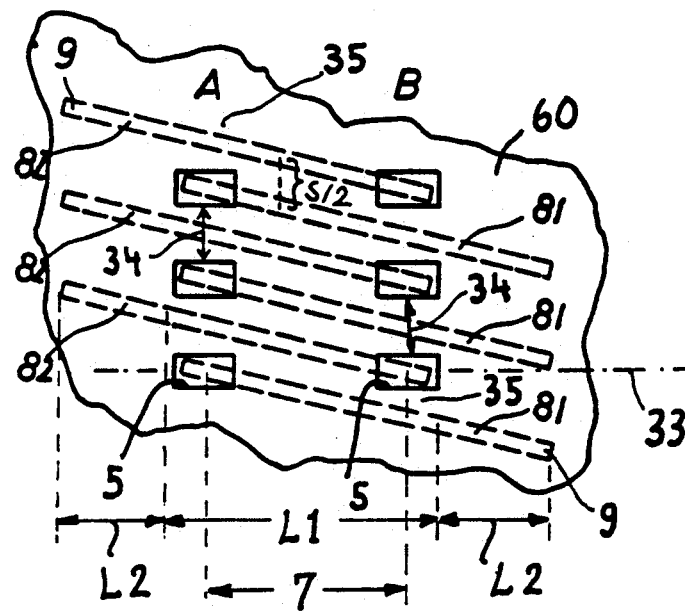
FIG. 5 shows schematically the preferred arrangement of the contact elements of a contacting apparatus for a SI module.

FIG. 5 shows similarly to FIG. 4 a preferred arrangement of the contact elements 81, 82 in a contacting apparatus 60. In accordance with the invention the contact element pitch or contact element spacing is cut in half to S/2, so as to reduce (compared with FIG. 4) the length L1 of the contacting apparatus 60 by the distance 7 of rows A, B (provided that in FIG. 5 contact elements having the same length as in FIG. 4 were used). It can be recognized that the contact elements 81 for contacting the row A of SIM contacts extend between the contacts for row B and the contact elements 82 of the contacting apparatus 60 for contacting row A extend between the contacts of row A. Thus, contact elements 81, 82 are in an interleaving or intermeshing arrangement. The contact elements 81, 82 are shown to be extended by a length L2 compared with the contact elements 6 of FIG. 4. For contacting the SIM contacts of row A and also for contacting the SIM contacts of row B, the same type of contact elements 81, 82 can be used which allows easy manufacture of the contact elements. The termination ends 9 of the contact elements 81 and 82 are shown to be oppositely arranged. The contact elements 81, 82 are inclined by an angle with respect to a horizontal line 33 connecting adjacent cutouts 5 preferably such that said interleaving contact elements 81, 82, extend within spaces 34 defined between said cutouts 5. The outermost (top and bottom) contact elements 82, 81 extend in spaces 35 beyond said cutouts 5.

Figure 6:
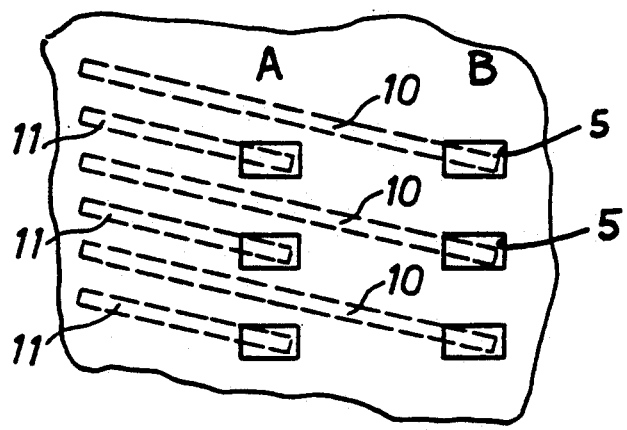
FIG. 6 discloses another preferred arrangement of the contact elements of a contacting apparatus for a SI module, with all contact elements being contacted (terminated) from one side.

FIG. 6 discloses another embodiment of a contacting apparatus 60 of the invention according to which different length contact elements 10 and 11, respectively, are used for the rows A and B of SIM contacts (represented by cutouts 5), respectively. In this case the termination ends of the contact elements 10, 11 are located on the same (left) side. Having the termination end on one side is advantageous for the surface mounted technology.

Figure 7:
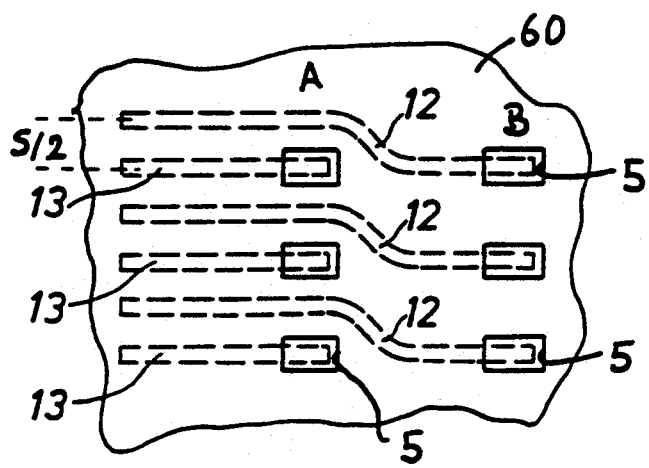
FIG. 7 another preferred arrangement of the contact elements, particularly for the surface mounted technology and for contact element termination at only one side.

FIG. 7 discloses a still further embodiment of a contacting apparatus 60 of the invention in accordance with which again a one side termination is provided for contact elements 12 and 13. This kind of arrangement is particularly suitable for the surface mounted technology (SMT). The contact elements 12, 13 interleave. One set of contact elements 13 is straight, the other set of contact elements 12 extends between the straight contact elements 13 for row A and curves to reach the contacts of row B. The spacing of the contact elements is again S/2.

Even though the present invention is provided specifically for a contacting apparatus for SI modules, the embodiments of the invention can also be used for particularly short contacting apparatus for IC or chip cards.

Reading Position Indicating Switch

The relatively short contact elements or contact springs 81, 82, 10, 11, 12, 13 provide only for a small spring movement or path. Thus, it is difficult to realize a switch which will be contacted after the contact elements (also called reading contact elements) have made contact with the contacts of the SIM card, so as to indicate that a SIM card (or a chip card) has reached its reading position in the contacting apparatus.

In accordance with the invention a reading position indicating switch is provided in said contacting apparatus which will be actuated by a locking element used for locking the SIM card in its reading position. The purpose of the switch is to indicate that the reading position has been reached for the SIM card.

In accordance with the present invention a cover or lid acts as a locking element (not shown). The cover is adapted to press the SIM card with its contacts 1 against the contact elements of the contacting apparatus so that the switch is safely actuated as soon as the reading position has been reached by the SIM card 92. Moreover, the lid can be used as a SIM card receptacle.

Figure 8:
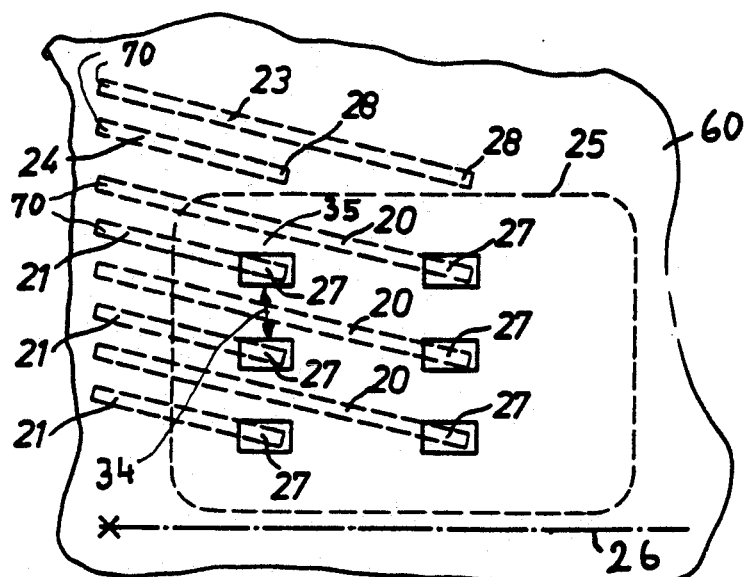
FIG. 8 the arrangement of the contact elements of a contacting apparatus for a SIM in accordance with the invention together with a switch adapted to indicate that the SIM is in its reading position.

FIG. 8 discloses an embodiment of the invention according to which the termination ends 70 of the contact elements 20, 21 and also of the reading position indicating switch contact elements 23 and 24 are on the same (left) side. The SIM card is schematically shown at 25. It is also possible to interpret the dashed line 25 as the receiving opening for the SIM card located in contacting apparatus 60. Reference numeral 26 refers to the axis of the above mentioned pivotable cover which is not shown. Said cover is mounted to said contacting apparatus 60 and is adapted to hold the SIM in its reading position. The inwardly or (in FIG. 8) rightwardly extending ends of the switch contact elements 23 and 24 are located in the area of the cover to be closed. Indeed, the cover to be closed will press on the one hand the SI module card with its contact areas 1 against the contacts 27 of the contact elements 20, 21, and will on the other hand eventually provide—at the end of the pivot movement of the cover—a connection between the two contact ends 28 of the contact elements 23, 24. This connection between the ends 28 of contact elements 23, 24 can be realized for instance by a metallic strip located on said cover.

In the embodiment of FIG. 8 the switch formed by contact elements 23, 24 uses the same kind of contact elements as are used for the reading contact elements, i.e. the contact elements adapted to cooperate with the contacts 1 of the SIM card.

Figure 9:
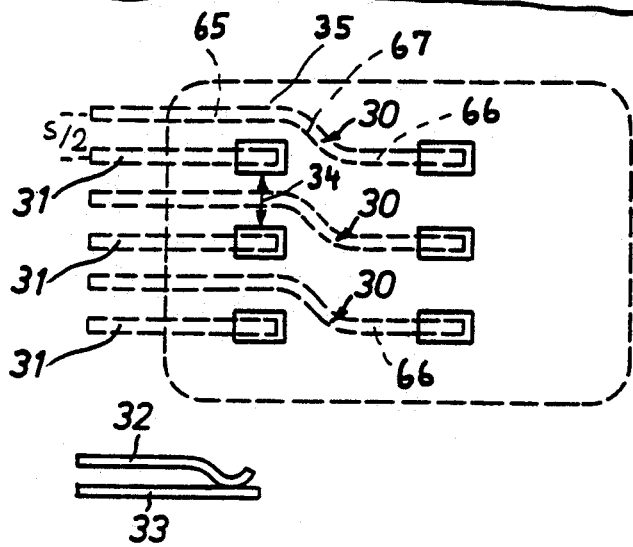
FIG. 9 the preferred arrangement of the contact elements of a SIM contacting apparatus of FIG. 7 together with another reading position indicating switch.

In contrast to the switch design of FIG. 8, the reading position indicating switch shown in FIG. 9 comprises a pair of modified reading contacts 32, 33. Moreover, in FIG. 9 the contact elements 30, 31 (like the ones of FIG. 7) are of a design different from what is shown in FIG. 8. The contact elements 31 have a straight shape, while the contact elements 30 have two straight parts 65, 66 which are connected by an inclined part 67. The straight contact elements 31 and the straight parts 65 are interleavedly arranged, again with half of the spacing S of FIG. 4. The embodiment shown in FIG. 9 does not require a conducting strip or the like in the cover for actuating the switch 32, 33 which is used to indicate the reading position, but the cover is used for actuating the switch 32, 33.

Figure 10:
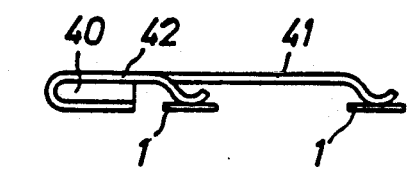
FIG. 10 schematically a side view disclosing the contacting relationship of the contacts of a SIM and a contacting apparatus for a key application.
Figure 11:
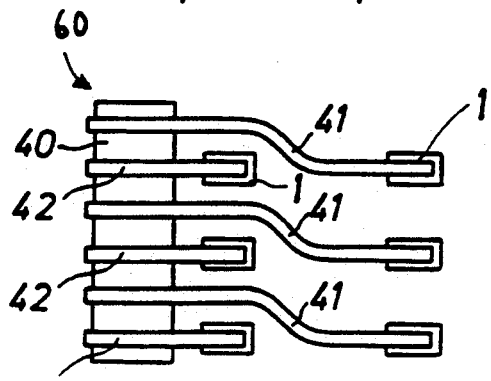
FIG. 11 a plan view of the key contacting apparatus of FIG. 10.

FIGS. 10 and 11 disclose another embodiment of a contacting apparatus 60 of the invention in which the SIM is schematically shown by its contact areas 1. Said contact areas 1 are permanently contacted by means of contact elements 41, 42. Said contact elements 41, 42 are guided around an insulating member 40 so as to form their contact areas or contact locations in the area around the insulating member 40. This will allow for a a high number of connecting cycles. This embodiment is preferably used in key applications in which the entire contacting apparatus 60 together with the permanently contacted SIM card forms a key which can be inserted with its contact locations into an apparatus for reading the information in the SIM to determine if the inserted key is an authorized key.

It will be understood by a person skilled in the art that the above schematic representations relate only to the essence of the invention and do not show components of customary design. For instance, the contacting apparatus comprises support means for the contact elements for supporting said contact elements. Also, the contact elements of said contacting apparatus, which are also called reading contact elements, can be mounted preferably in a biased manner in said contacting apparatus. The contacting apparatus further comprises receiving means for the SIM as was mentioned shortly in connection with the description of FIG. 4.

We claim:

1. A contacting apparatus for a SIM comprising: contact elements mounted in said contacting apparatus and adapted to provide a contacting engagement with contact areas of a SIM located in said contacting apparatus, wherein for a SIM having a first row and a second row of contact areas, said contact areas being aligned such that axes connecting contact areas in the first row with respective contact areas in the second row are perpendicular to axes connecting contact areas in the same row, a first plurality of said contact elements are arranged to contact SIM contact areas of the first row, and a second plurality of said contact elements are arranged to contact SIM contact areas of the second row, and wherein each contact element of said first plurality is adjacent a contact element of said second plurality such that each adjacent contact element contacts a contact area in a different one of said rows.

2. The contacting apparatus of claim 1 wherein said contact elements of said first plurality are mounted to extend through vertical spaces of the contact areas of at least another row.

3. The contacting apparatus of claim 2 wherein said contacting elements of said first and second pluralities are identical and are arranged in an interleaved manner providing termination ends at two opposite sides of the contact elements.

4. The contacting apparatus of claim 2 wherein said contacting elements of said first and second pluralities are different and termination ends of said different contact elements are located on one side of the contact elements.

5. The contacting apparatus of claim 1 wherein a switch is provided to indicate that the reading position of the SIM is achieved, said switch comprising contact elements which are identical to the contact elements adapted to contact the contact areas of said SIM.

6. The contacting apparatus of claim 5 wherein said switch is located outside of an area defined by said SIM.

7. The contacting apparatus of claim 1 wherein the contact areas of the SIM are permanently contacted by contact elements which provide contact locations for high contacting cycles.

8. The contacting apparatus of claim 7 wherein the contact elements are arranged about an insulating member so as to form a chip key.

* * * * *